United States Patent
Redinger

[11] Patent Number: 5,915,842
[45] Date of Patent: Jun. 29, 1999

[54] ELASTOMERIC BEARING AND ASSEMBLY METHOD THEREFOR

[75] Inventor: W. Scott Redinger, Erie, Pa.

[73] Assignee: Lord Corporation, Cary, N.C.

[21] Appl. No.: 08/957,945

[22] Filed: Oct. 27, 1997

[51] Int. Cl.[6] .......................... F16C 23/04; F16C 27/06; B60G 11/22
[52] U.S. Cl. .................. 384/203; 29/441.1; 29/898.049; 267/281; 264/242
[58] Field of Search ..................................... 384/192, 202, 384/203, 215, 220, 221, 222, 297, 299, 300, 206, 207, 208, 209, 210; 403/143, 141, 140, 135; 267/276, 279, 281, 292, 293; 29/441.1, 898.043–898.051; 264/242, 263

[56] References Cited

U.S. PATENT DOCUMENTS

| | | | |
|---|---|---|---|
| 2,766,079 | 10/1956 | Browne | 384/209 |
| 2,906,568 | 9/1959 | Gray | 384/210 |
| 3,089,198 | 5/1963 | Eirhart, Jr. | 264/242 |
| 3,744,859 | 7/1973 | Ringel | 384/206 |
| 3,874,050 | 4/1975 | White | 29/898.047 |
| 4,033,019 | 7/1977 | Orkin | 384/203 X |

*Primary Examiner*—Thomas R. Hannon
*Attorney, Agent, or Firm*—Randall S. Wayland

[57] ABSTRACT

An elastomer bearing (20) and assembly method therefor. The bearing (20) includes an inner member (22) having an outer profiled surface with a maximum radial dimension, an outer member (24) having a minimum radial dimension which is smaller than said maximum radial dimension and a inner profiled surface. The outer member (24) includes first (26) and second halves (28) being inserted axially over the spherical portion (23) of inner member (22). Each halve (26, 28) including axial threaded portions (32) which are threadedly interconnected to secure halves (26, 28) together. An elastomer layer (30) is bonded to said outer profiled surface of said inner member (22) and said inner profiled surface of said outer member (24). In another aspect, the profiled surfaces are spherical surfaces. Preferably, air is vented into the threaded escapeway (33) during the bonding process. A radial gap (34) is provided to aid is air removal/venting.

11 Claims, 3 Drawing Sheets

ELASTOMERIC BEARING AND ASSEMBLY METHOD THEREFOR

FIELD OF THE INVENTION

The invention relates to elastomer bearings, construction, and assembly thereof.

BACKGROUND OF THE INVENTION

Elastomer bearings include an inner member, and outer member and a compliant or flexible member, such as a bonded elastomer. Preferably, the elastomer is bonded to each of the inner and outer members. Bearings can take the form of spherical thrust bearings, sandwich bearings, rod end bearings, spherical joints, conical bearings, tubeform bearings, each of which is designed to carry load and/or torque and/or accommodate motions. Each are well known in the art. Within the area of spherical bearings and joints, a spherical surface having an outer spherical profile and radius is formed on the inner member. A somewhat larger radius and profiled surface is formed on the outer member. This difference between these radii defines the elastomer layer thickness.

In such bearings, a wrap around angle $\phi w$ is formed by the outer member. The wrap around angle $\phi w$ is determined by the bearing requirements, i.e., the needed load area for carrying axial and/or radial loads, or by stiffness criteria. In general, if the wrap around angle $\phi w$ requirement is small enough, there can be interference between the outer member and inner member such that installation of the outer member over the inner member can be difficult. In such cases, specialized assembly methods are required.

Within the prior art, it is know to use split outer members such as shown in FIG. 1, one having a recessed portion 10, the other including a complimentary recess angle 12, and a brass ring 14 which is pressed into the recessed portion 10 to retain the first half 16 from movement relative to the second half 18. After assembly, the elastomer 19 is bonded to the inner member 11 and outer member 13. Notably, over time, such joint assemblies have the tendency of working loose, further, when small thicknesses are involved, venting becomes a problem.

Therefore, a need exists for an elastomer bearing and assembly method therefor which allows small wrap around angles and ruggedness for long duration use and which may provide venting is cases where small thicknesses are used.

SUMMARY OF THE INVENTION

Therefore, in light of the advantages and drawbacks of the prior art, the present invention, in one aspect thereof, is an elastomer bearing comprising an inner member having an outer profiled surface which exhibits a maximum radial dimension, an outer member having a minimum radial dimension which is smaller than the maximum radial dimension of the inner member and a inner profiled surface which corresponds to a shape of said outer profiled surface, said outer member including first and second halves each having an axial threaded portion which are threadedly interconnected to secure halves together, and an elastomer layer bonded to said outer profiled surface of said inner member and said inner profiled surface of said outer member.

In accordance with another aspect of the present invention, an elastomer bearing is provided comprising an inner member having in inner spherical radius Ri, an outer member having an outer radius Ro and a wrap-around radius Rw, said wrap around radius Rw being smaller than said inner spherical radius Ri, said outer member including first and second halves each having axial threaded portions which are threadedly interconnected to secure halves together, and an elastomer layer bonded to said inner spherical radius Ri of said inner member and said outer radius Ro of said outer member.

In another aspect, the space between the axial threaded portions is used for venting air during bonding process. Preferably also, a radial gap formed between said halves provides an escapeway for air to enter into the threaded escapeway.

In another aspect a method is provided for assembling an elastomeric bearing, comprising the steps of: inserting a first half of an outer member axially over a first spherical half of an inner member, inserting a second half of an outer member axially over a second spherical half of an inner member, threading said first half onto said second half, and bonding an elastomer member to said first and said second half.

It is an object of the present invention to provide an elastomer bearing which has a small wrap around angle which survive repetitive dynamic axial loading without degradation.

It is another object of the present invention to provide a method for assembly of small wrap-around angle bearings, such as spherical bearings.

BRIEF DESCRIPTION OF THE DRAWINGS

The accompanying drawings which form a part of the specification, illustrate several embodiments of the present invention. The drawings and description together serve to fully explain the invention. In the drawings, like reference numbers are used to designate the same or similar items throughout the several figures wherein.

DETAILED DESCRIPTION OF THE PREFERRED EMBODIMENT OF THE INVENTION

Figure 1:
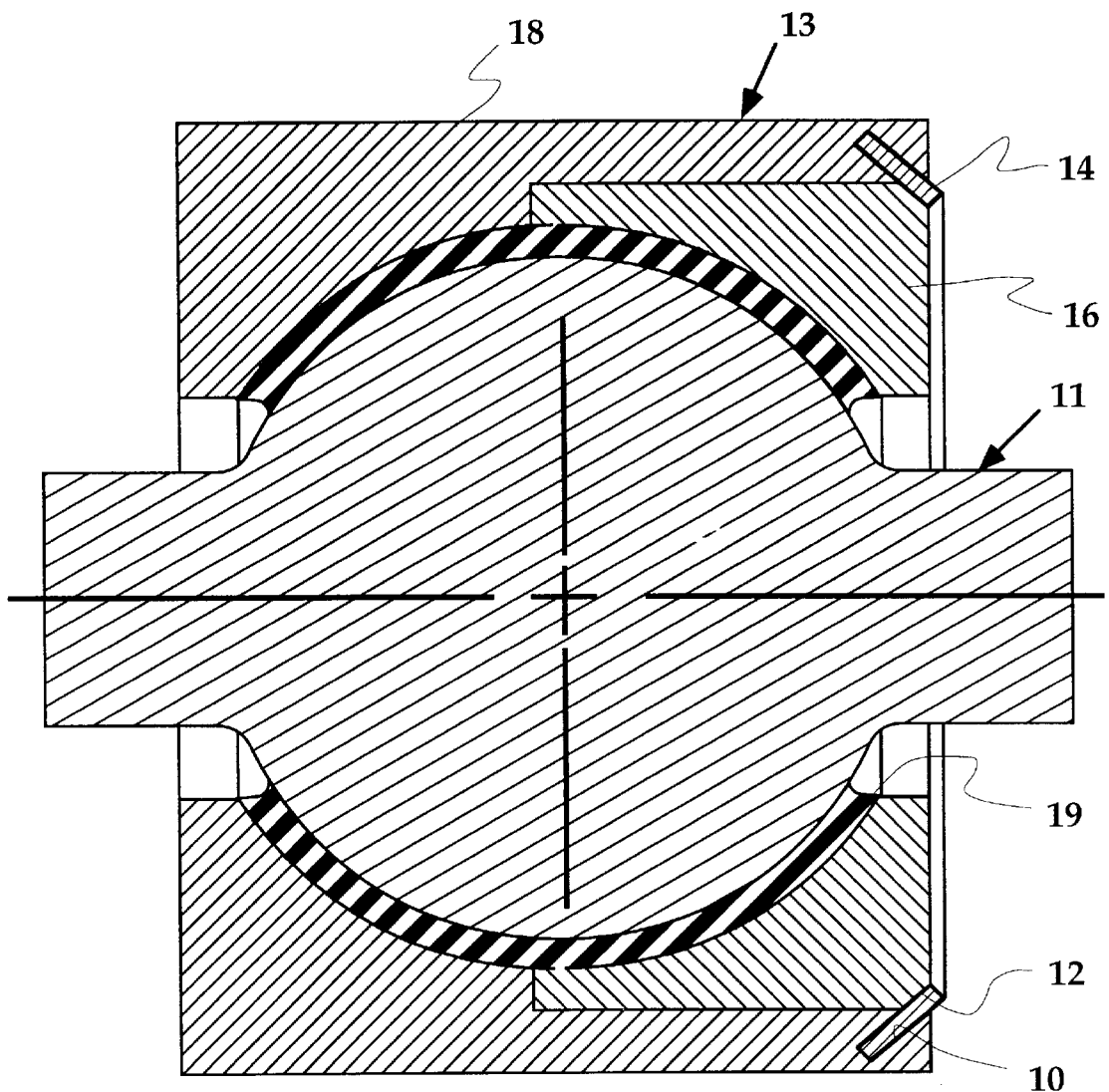
FIG. 1 is a cross-sectioned side view of a prior art bearing assembly.
Figure 2:
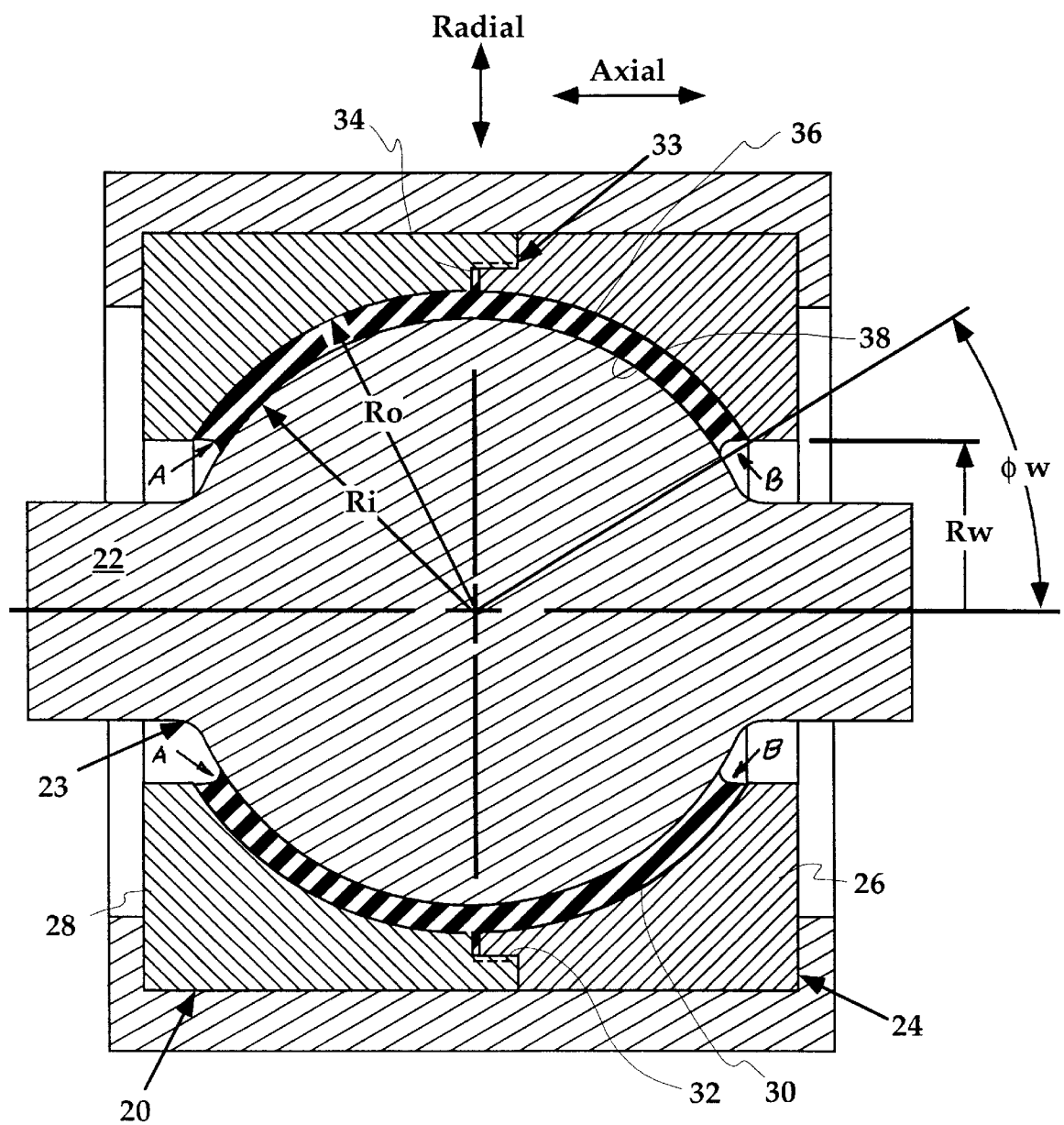
FIG. 2 is a cross-sectioned side view of a preferred embodiment of the present invention bearing.

Referring now to FIG. 2, an elastomer bearing 20 in accordance with the present invention is described. In this first embodiment, the inner member 22 has in inner generally spherical radius Ri (a maximum radial dimension) and an outer radial profiled surface 36. The outer member 24 includes an inner radial profiled surface 38 having an outer radius Ro and a wrap-around radius Rw (a minimum radial dimension). The wrap-around radius Rw (a minimum radial dimension) being determined by the well known wrap-around angle $\phi w$. The present invention is most useful when the wrap-around radius Rw is smaller than the inner spherical radius Ri (a maximum radial dimension) of the inner member 22. In this case, the outer member 24 has an interference fit in an axial direction with the inner member 22. Further, the outer member 24 and inner member 22 are connected to portions of a larger assembly which are relatively moveable.

Figures 3, 4:
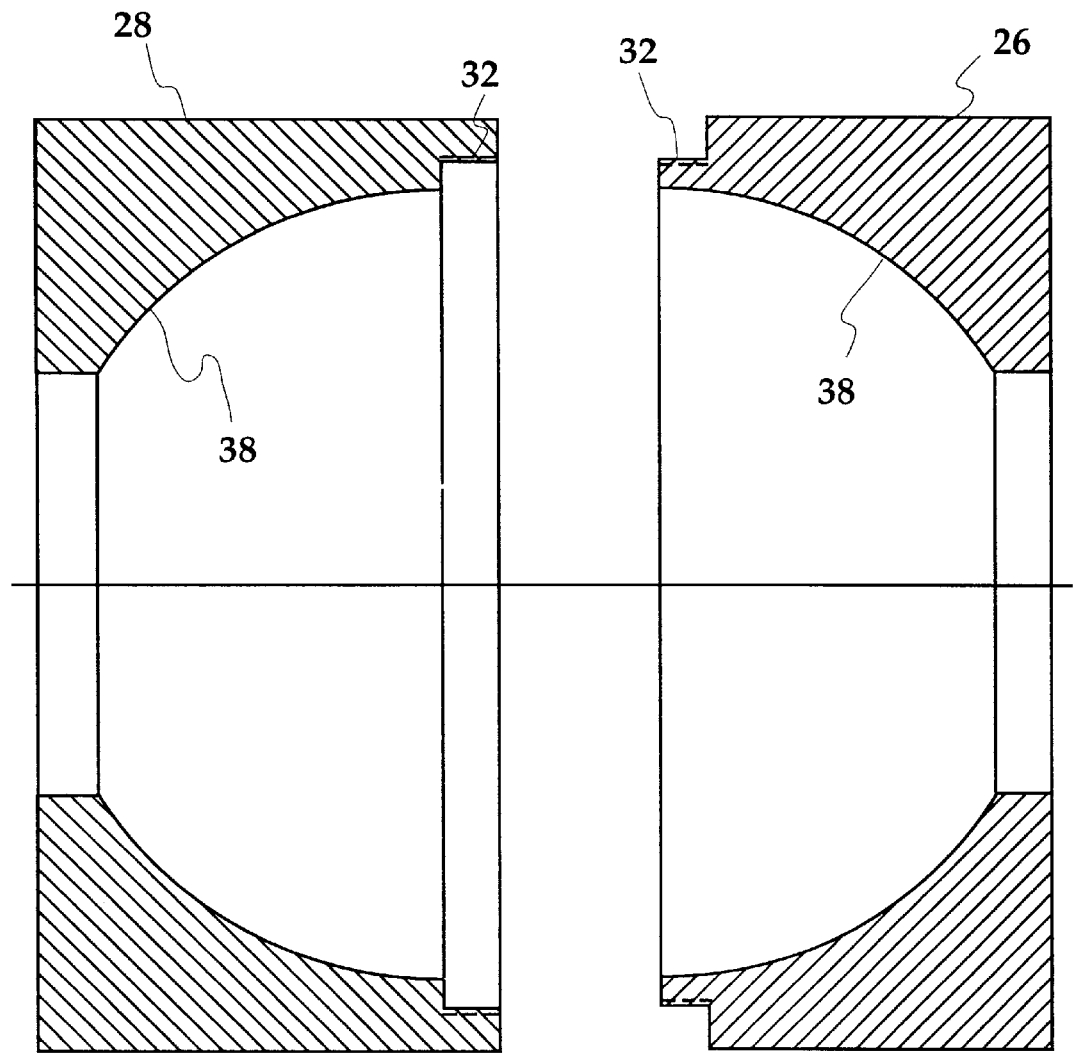
FIG. 3 and 4 are cross-sectioned side views of the halves of the outer member in accordance with the present invention bearing.

Preferably, the shape of the inner profiled surface 36 corresponds to the shape of said outer profiled surface 38, for example, each being spherical. However, it should be apparent to one of ordinary skill in the art that back-to-back conical, or other shape variations which allow torsional motion and/or pivotal motion may be employed. To enable assembly, the outer member 24 includes first 26 and second halves 28. Each of the halves 26, 28 includes an axial threaded portion 32 as shown in FIG. 3 and 4. Suitable adhesive is applied to each of the profiled surfaces 36, 38. The halves 26, 28 are then received axially over the halves of the spherical portion 23 of the inner member 22 and the threaded portions 32 are threadedly interconnected to secure the halves 26, 28 together and form the threaded escapeway 33.

The threaded portions 32 are formed on the extensions/protrusions axially protruding from each of halves 26, 28. Once assembled, the unbonded assembly is placed in a mold and elastomer is injected or transferred into the space between the inner radial profiled surface 36 and the outer radial profiled surface 38 and cured to form an elastomer layer 30. The elastomer material may be a natural rubber, natural rubber and polybutadiene blend, nitrile, EPDM, viton, or other suitable flexible material. The resultant elastomer member 30 is chemically bonded to the inner spherical radius Ri of said inner member 22 and said outer radius Ro of said outer member 24.

Preferably, a space between the engaged thread teeth on axial threaded portions 32 is provided for forming a threaded escapeway 33 which is used for venting air during the bonding process, i.e., the air escapes into the space between the engaged threaded sections. Preferably, a radial gap 34 of about 0.005 inch (0.197 mm) wide is formed between the halves 26, 28 to provides an escapeway to allow air to easily vent and also enter into the threaded escapeway 33. This radial gap 34 is formed by projection on first half 26 which is slightly shorter than projection on second half 28. Bleed elastomer is allowed to enter into the gap 34 and escapeway 33. Adding central venting via adding the gap 34 and/or threaded escapeway 33 allows sprueing of elastomer from both axial ends of the bearing 20, thereby minimizing elastomer travel and pressure drop during bonding. Sprue locations are indicated by arrows A and B.

While the form of the bearing and method herein described includes a preferred embodiment of this invention, it is to be understood that the invention is not limited to this precise form of the bearing and method and that changes may be made therein without departing from the scope of the invention which is defined in the appended claims.

What is claimed is:

1. A spherical elastomeric bearing, comprising:
   (a) an inner member having an inner spherical radius,
   (b) an outer member having an outer radius and a wrap-around radius, said wrap around radius being smaller than said inner spherical radius, said outer member including first and second halves each having an axial threaded portion which are threadedly interconnected to secure halves together, and
   (c) an elastomer layer bonded to said inner spherical radius of said inner member and said outer radius of said outer member.

2. A bearing of claim 1 wherein a volume controlled by said axial threaded portions is used for venting air during a bonding process.

3. A bearing of claim 1 wherein a volume formed by a radial gap formed between said halves is used for venting air during a bonding process.

4. A bearing of claim 1 wherein a volume controlled by said axial threaded portions and a radial gap formed between said halves is used for venting air during a bonding process.

5. An elastomeric bearing, comprising:
   (a) an inner member having an outer profiled surface having an maximum radial dimension,
   (b) an outer member having an minimum radial dimension which is smaller than said maximum radial dimension of said inner member and a inner profiled surface which corresponds to a shape of said outer profiled surface, said outer member including first and second halves each having an axial threaded portion which are threadedly interconnected to secure halves together, and
   (c) an elastomer layer bonded to said outer profiled surface of said inner member and said inner profiled surface of said outer member.

6. A method for assembling an elastomeric bearing, comprising the steps of:
   a) inserting a first half of an outer member axially over a first spherical half of an inner member,
   b) inserting a second half of an outer member axially over a second spherical half of an inner member,
   c) threading said first half onto said second half, and
   d) bonding an elastomer member to said first and said second half.

7. A method of claim 6 further including the steps of sprueing elastomer into opposed axial ends of said bearing.

8. A method of claim 6 further including the steps of centrally venting said elastomer.

9. A method of claim 6 further including the steps of venting said elastomer into a radial gap.

10. A method of claim 6 further including the steps of venting said elastomer into a threaded escapeway.

11. A method of claim 6 further including the steps of venting said elastomer into a radial gap and a threaded escapeway.

* * * * *